United States Patent [19]

Kim

[11] Patent Number: 5,751,520
[45] Date of Patent: May 12, 1998

[54] HEAD DRUM ASSEMBLY OF A VIDEO CASSETTE RECORDER

[75] Inventor: Keum-Mo Kim, Seoul, Rep. of Korea

[73] Assignee: Daewoo Electronics Co., Ltd., Seoul, Rep. of Korea

[21] Appl. No.: 766,209

[22] Filed: Dec. 12, 1996

[30] Foreign Application Priority Data

Dec. 13, 1995 [KR] Rep. of Korea ............... 95-49274

[51] Int. Cl.$^6$ ............................................. G11B 15/61
[52] U.S. Cl. ............................................. 360/107
[58] Field of Search ........................... 360/107, 108; 384/114–120

[56] References Cited

U.S. PATENT DOCUMENTS

| 4,961,122 | 10/1990 | Sakai et al. | 360/107 |
| 4,972,283 | 11/1990 | Kim | 360/107 |
| 5,277,499 | 1/1994 | Kameyama | 384/123 |

FOREIGN PATENT DOCUMENTS

898877  6/1962  United Kingdom.

*Primary Examiner*—Robert S. Tupper

[57] ABSTRACT

Disclosed is a head drum assembly of a video cassette recorder which can support the radial load and the thrust load of the shaft. The head drum assembly includes a lower drum, an upper drum, a motor for generating a rotational force, a shaft for transferring the rotational force of the motor to the upper drum, a housing formed at an inner portion thereof with lubricant containing grooves, lubricating pads for containing the lubricant and being inserted into the lubricant containing grooves, bearings inserted into the housing, and a shield plate disposed between the bearing and the upper drum, for preventing the evaporation of the lubricant of the bearing. The radial load and thrust load of the shaft are effectively supported, a long term lubrication can be achieved by the prevention of the evaporation of lubricant in the bearing, and jittering and wow-fluttering can be prevented while recording a video information onto a magnetic tape or reproducing the video information from the magnetic tape.

9 Claims, 7 Drawing Sheets

HEAD DRUM ASSEMBLY OF A VIDEO CASSETTE RECORDER

BACKGROUND OF THE INVENTION

1. Field of the Invention

The present invention relates to a head drum assembly of a video cassette recorder, and more particularly to a lubricating apparatus for supporting and lubricating a shaft of the head drum assembly.

2. Description of the Prior Art

A video cassette recorder (hereinafter, referred to as a VCR) generally includes a base (main chassis or deck), a running system installed on the base for drawing out a magnetic tape from a cartridge and for running the magnetic tape along a predetermined path, and a head drum assembly for recording and reproducing video signals on and from the magnetic tape. The head drum assembly includes an upper drum on which there are magnetic heads for recording and reproducing video signals on and from the tape, and a lower drum positioned below the upper drum, on which there is a motor for rotating the upper drum. The upper drum records or reproduces the video signals on and from the tape while the motor is in operation.

Nevertheless, if vibration and noise are generated during the rotation of the upper drum, the heads cannot record or reproduce the video signals on and from the tape clearly and the graphic quality is deteriorated. Therefore, the vibration and noise should be controlled as much as possible. In order to settle the above-mentioned problems, a head drum assembly is provided with a lubricating apparatus. A lubricating apparatus reduces vibration and noise of an upper drum of a head drum assembly by supporting and lubricating a shaft which rotates the upper drum. A lubricating apparatus generally uses ball bearings or a fluid dynamic pressure bearing.

Figure 1:
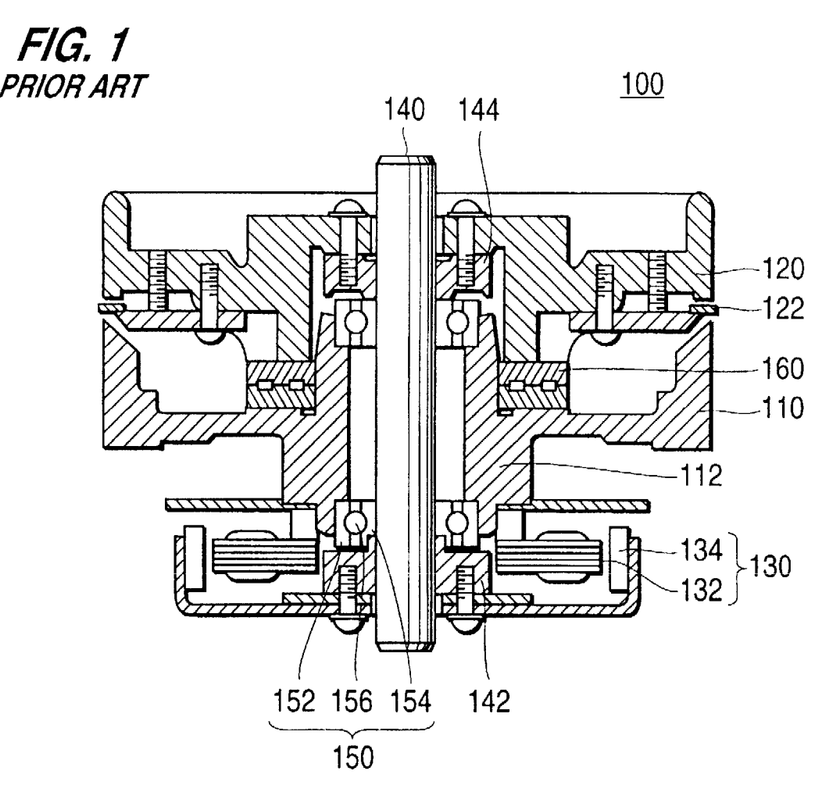
FIG. 1 is a longitudinal sectional view of a conventional head drum assembly employing ball bearings.

FIG. 1 shows a conventional head drum assembly of a VCR which uses a lubricating apparatus employing ball bearings. As shown in FIG. 1, a head drum assembly 100 includes a lower drum 110, an upper drum 120 for recording and reproducing audio and video signals on and from a magnetic tape (not shown), a motor 130 mounted on lower drum 110 for generating a rotating force, a shaft 140 for transferring the rotating force of motor 130 to upper drum 120, and a pair of ball bearings 150 provided between shaft 140 and lower drum 110 for rotatably supporting and lubricating shaft 140.

Motor 130 includes a stator 132 mounted on lower drum 110 at one side of the lower surface of lower drum 110, and a rotor 142 which is rotated in magnetic conjunction with stator 134. Rotor 134 is located radially spaced apart from stator 132. Shaft 140 is mounted on rotor 134 at the inner side of rotor 134 by a lower flange 142 and is fixed to upper drum 120 by an upper flange 144 at the upper portion thereof, so that shaft 140 and upper drum 120 rotate together with rotor 134 during the rotation of rotor 134.

Mounted on upper drum 120 are at least two magnetic heads 121 for recording and reproducing audio and video signals on and from the magnetic tape. Magnetic heads 121 are electrically connected to lower drum 110 through the lower surface of upper drum 120 and a rotary transformer 130 installed to the upper surface of lower drum 110. Therefore, magnetic heads 121 can be electrically connected to peripheral devices, e.g., an amplifier or the like, while upper drum 120 is rotating. Formed at the inner side of lower drum 110 is an bearing 112 which receives ball bearings 150.

Each of ball bearings 150 includes an outer race 152 inserted into and fixed to the inner side of bearing housing 112, an inner race 154 into which shaft 140 is inserted, and a plurality of balls which are interposed between inner and outer races 152 and 154 to support and lubricate shaft 150.

Balls 156 are made of steel, and roll and slide between inner and outer races 152 and 154, thereby supporting and lubricating shaft 150. A lubricant may be supplied between inner and outer races 152 and 154 to reduce the friction of balls 156 against inner and outer races 152 and 154.

However, in the ball bearings 150, a vibration may be generated between balls 156 and inner and outer races 152 and 154. As a result, the graphic quality of the head drum 100 may be deteriorated.

Recently, fluid dynamic pressure bearings are used to overcome the above-mentioned disadvantages of ball bearings 150. Lubricating apparatuses using fluid dynamic pressure bearings are disclosed in U.S. Pat. No. 4,972,283 issued to Kim on Nov. 20, 1990 and U.S. Pat. No. 5,277,499 issued to Kameyama on Jan. 11, 1994.

Figure 2:
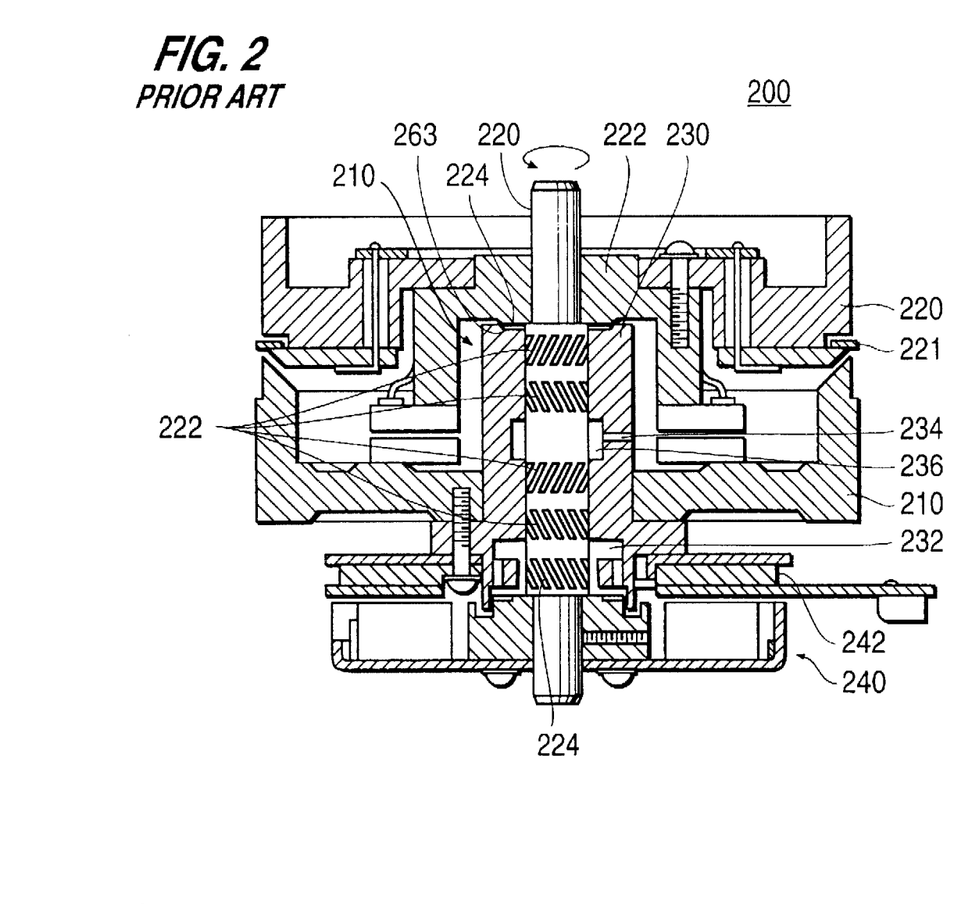
FIG. 2 is a longitudinal sectional view of a conventional head drum assembly employing a fluid dynamic pressure bearing.

FIG. 2 shows a head drum assembly using the lubricating apparatus of Kim. As shown in FIG. 2, an apparatus 210 of a head drum assembly 200 includes a shaft 220, the outer surface of which containing a plurality of slots 222 and a plurality of fluid guiding grooves 224, and includes a bearing housing on which a lubricant containing groove 232 and an air flowing groove 236 are formed.

Slots 222 are formed at the upper and lower portions of shaft 220, and fluid guiding grooves 224 are formed at the lower portion of shaft 220 adjacent lubricant containing groove 232. Lubricant containing groove 232 is formed at the inner side of bearing housing 230 at the lower portion of bearing housing 230, and contains the lubricant. Air flowing groove 236 is formed at the inner side of bearing housing 230 at a middle portion of bearing housing 230 and is connected to air flowing hole 234, through which air is introduced from outside. As shaft 220 rotates, the lubricant in lubricant containing groove 232 flows along fluid guiding groove 224 formed on the outer surface of shaft 220. The air introduced into bearing housing 230 through air flowing hole 234 is mixed in slots 222 with the lubricant flowing along fluid guiding groove 224.

Shaft 220 rises when it rotates by the rotating force of motor 240. Then, the lubricant in lubricant containing groove 232 flows to the outer surface of shaft 220 along fluid guiding groove 224. The air is introduced in to the interior of air flowing groove 236 through air flowing hole 234 of bearing housing 230. Mixed between shaft 220 and bearing housing 230 are the lubricant flowing along fluid guiding groove 224 and the air introduced into the interior of bearing housing 230. The mixed fluid flows along fluid guiding grooves 224 of shaft 220. As a result, the fluid pressure in fluid guiding grooves 224 becomes larger than the fluid pressure at the outer surface of shaft 220, where fluid guiding grooves 224 are not formed. Therefore, the radial load of shaft 220 is supported.

Nevertheless, in the lubricating apparatus 210 of Kim, it is not easy to form slots 222 and fluid guiding grooves 224 on the outer surface of shaft 220. Further, as the lubricant becomes depleted over time, thereby deteriorating the lubricating effect of the apparatus, a vibration can be generated during the rotation of shaft 220.

The lubricating apparatus of Kameyama was suggested to settle the above-mentioned problems. The apparatus of Kameyama includes a shaft and a sleeve having a thrust receiver opposing an end surface of the shaft, into which the shaft is rotatably received. On the inner surface of the sleeve near an opening thereof is formed an annular groove. On the outer surface of the shaft is formed a plurality of shallow grooves. When the shaft rotates, a fluid flows between the inner surface of the sleeve and the outer surface of the shaft by an action of the shallow grooves. Then, the fluid flows upward from the center portion of the sleeve at which the shaft keeps in contact with the sleeve, thereby decreasing the friction between the shaft and the sleeve.

Nevertheless, in the lubricating apparatus of Kameyama, since the shaft rotates while it is floated from the center portion of the sleeve, the upper and lower portions of the shaft can be biased. The biasing of the shaft causes the vibration of the upper drum of a head drum assembly, thereby deteriorating the graphic quality of the head drum assembly.

SUMMARY OF THE INVENTION

Accordingly, an object of the present invention is to provide a head drum assembly of a video cassette recorder utilizing a lubricating device which can prevent a vibration, can be easily manufactured, and can provide a long term lubrication.

To achieve the object, the present invention provides a head drum assembly comprising:

a lower drum;

a motor for generating a rotational force, the motor being installed in the lower drum;

an upper drum including magnetic heads for recording a video information onto a magnetic tape and for reproducing the video information from the magnetic tape during the rotation of the upper drum, the upper drum being mounted on the lower drum;

a transformer for electrically connecting the magnetic heads to an external apparatus while the upper drum is being rotated, the transformer being installed between a lower surface of the upper drum and an upper surface of the lower drum;

a shaft installed in the motor so as to transfer the rotational force of the motor to the upper drum;

a bearing housing formed at an upper inner portion thereof with a pair of first lubricant containing grooves and formed at a lower inner portion thereof with a pair of second lubricant containing grooves, the each pair of first and second lubricant containing grooves being disposed in a longitudinal direction of the bearing housing in opposition to each other, the each of first and second lubricant containing grooves having a cylindrical shape, the bearing housing being disposed at an inner portion of the lower drum;

a first and second bearings for rotatably supporting the shaft, the first and second bearings being fixed and inserted into upper and lower portions of the bearing housing respectively;

a pair of first and second lubricating pads for supplying a lubricant between the journal bearing and the shaft, the first and second lubricating pads being inserted into the first and second lubricant containing grooves; and a shield plate for preventing evaporation of the lubricant which is supplied to the first bearing, the shield plate being disposed between the first bearing and the upper drum, the shaft being inserted into the shield plate, and the shield plate being fixed on a lower surface of the upper drum.

According to the present invention, the head drum assembly further comprises a cover formed at central portion with a supporting groove for rotatably supporting the shaft. The thrust load of the shaft is supported by the cover.

The shaft is rotatably inserted into the inner surfaces of the first and second bearings, and the outer surfaces of the first and second bearings make contact with the upper and lower inner surfaces respectively. The first and second bearings are inserted and fixed into the upper and lower inner surfaces of the bearing housing respectively. The first and second bearings are manufactured by sintering particles of an alloy such as a copper alloy in such a manner that bearings can contain a lubricant therein. Prior to inserting the first and second bearings into the bearing housing, the first and second bearings are dipped into a lubricant so as to absorb the lubricant therein.

The shaft is inserted into the shield plate, and the upper surface of the shield plate is abutted on the lower surface of the upper drum. The shield plate is formed at a lower surface thereof with a plurality of herringbone grooves. The lubricant evaporating from the first bearing concentrates at the herringbone grooves so that an oil film is formed between the shield plate and the first bearing. Thus, the evaporation of the lubricant from the first bearing is prevented.

The head drum assembly of a video cassette recorder of the present invention can continuously supply the lubricant into the bearings, thereby preventing the friction of the shaft. The head drum assembly of the present invention can prevent the evaporation of the lubricant from the bearings and has a simple construction, so it may be easily manufactured.

In addition, according to the head drum assembly for a video cassette recorder of the present invention, the radial load and the thrust load of the shaft can be effectively supported so that jittering and wow-fluttering can be effectively prevented.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENTS

Hereinafter, preferred embodiments of the present invention will be described in detail with reference to the accompanying drawings. In the drawings, similar reference numbers are used for similar elements.

Figure 3:
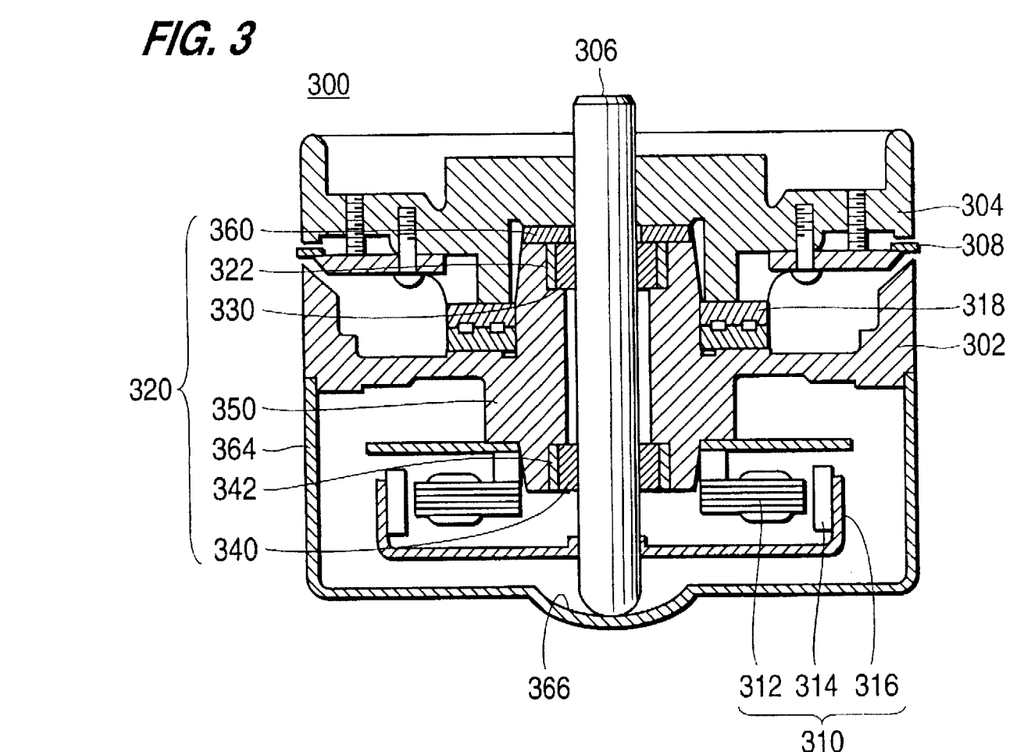
FIG. 3 is a longitudinal sectional view of a head drum assembly of a video cassette recorder according to the present invention.

FIG. 3 is a longitudinal sectional view of a head drum assembly 300 of a video cassette recorder according to a preferred embodiment of the present invention. As shown in FIG. 3, head drum assembly 300 according to the preferred embodiment of the present invention includes a lower drum 302, an upper drum 304 which records and reproduces video information onto and from a magnetic tape (not shown), a motor 310 for generating a rotational force and being mounted in lower drum 302, a shaft 306 which transfers the rotational force of motor 310 to upper drum 304, and a lubricating device 320 into which shaft 306 is rotatably inserted, and which supports and lubricates shaft 306.

Lower drum 302 is fixed to a base of the VCR. Motor 310 includes a stator 312 mounted at one side of the lower surface of lower drum 302, a rotor 314 which is radially spaced apart from stator 312 and is rotated in magnetic conjunction with stator 312, and a rotary plate 316, on which rotor 314 is mounted and which rotates together with rotor 314. Shaft 306 is connected to rotor 314 through rotary plate 316 and rotates together with rotor 314. Upper drum 304 is inserted into the upper portion of shaft and rotates together with shaft 306.

Mounted on upper drum 304 are at least two magnetic heads 308 which record and reproduce video information onto and from the magnetic tape during the rotation of shaft 306. Heads 308 are electrically connected to peripheral devices installed between the lower surface of upper drum 304 and the upper surface of lower drum 302. Therefore, heads 308 maintain electrical connection with a power source or the like while upper drum 304 is rotating.

Lubricating device 320 for rotatably supporting shaft 306 is disposed inside lower drum 302.

Figure 4:
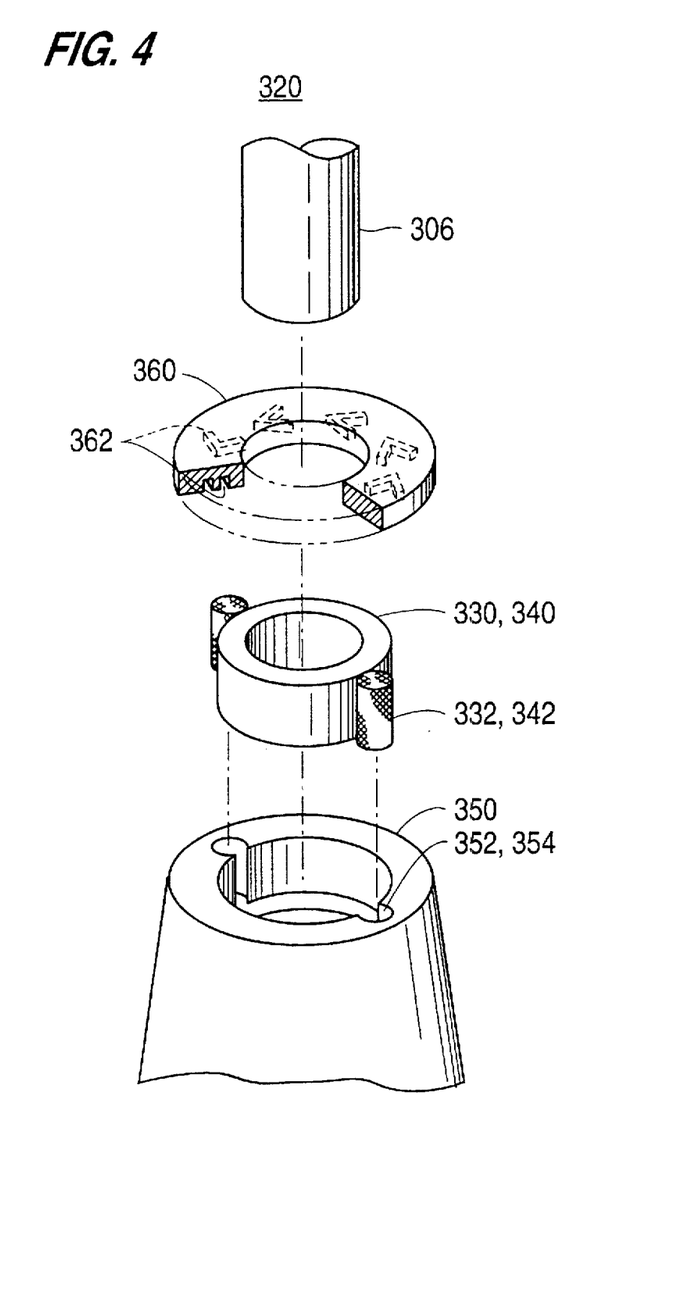
FIG. 4 is an exploded perspective view for showing a lubricating device in FIG. 3.

FIG. 4 is an exploded perspective view of lubricating device 320 of the VCR according to a preferred embodiment of the present invention. Lubricating device 320 includes a first and second bearings 330 and 340 into which shaft 306 is rotatably inserted, and a bearing housing 350 which receives first and second bearings 330 and 340, which is formed at its upper inner portion with a pair of a first lubricant containing grooves 352 disposed in opposition to each other, and which is formed at its lower inner portion with a pair of a second lubricant containing grooves 354 disposed in opposition to each other.

First and second bearings 330 and 340, into which shaft 306 is rotatably inserted, are fixedly inserted into bearing housing 350, and respective outer walls of first and second bearings 330 and 340 make contact with upper and lower inner walls of bearing housing 350. First and second bearings 330 and 340 are manufactured by sintering particles of an alloy such as a copper alloy in such a manner that first and second bearings 330 and 340 can contain a lubricant therein. Prior to inserting first and second bearings 330 and 340 into bearing housing 350, first and second bearings 330 and 340 are dipped into a lubricant so as to absorb the lubricant therein.

Preferably, each pair of first and second lubricant containing grooves 352 and 354 of bearing housing 350 is cylindrically shaped in the longitudinal direction of bearing housing 350. Each pair of first and second lubricant containing grooves 352 and 354 are disposed in opposition to each other at about a center of bearing housing 350.

A pair of first lubricating pads 332 are inserted into the pair of first lubricant containing grooves 352, and a pair of second lubricating pads 342 are inserted into the pair of second lubricant containing grooves 354. Each of first and second lubricating pads 332 and 342 has a cylindrical shape and is made of a lubricant absorbing material such as cotton or sponge. Lubricating pads 332 and 342 absorb a large amount of the lubricant and supply the absorbed lubricant to first and second bearings 330 and 340.

In addition, a shield plate 360 is disposed between first bearing 330 and upper drum 304, which prevents the evaporation of the lubricant of first bearing 330. Shield plate 360, into which shaft 306 is inserted, is abutted on the lower surface of upper drum 304. The upper surface of shield plate 360 is abutted on the upper surface of upper drum 304. Shield plate 360 is formed at the lower surface thereof with a plurality of herringbone grooves 362, and is made of a rubber and synthetic resin. The lubricant evaporating from first bearing 330 concentrates at herringbone grooves 362 so that an oil film is formed between shield plate 360 and first bearing 330. Thus, the evaporation of the lubricant in first bearing 330 is prevented.

A cover 364 for rotatably supporting shaft 306 is mounted on lower drum 302 and is formed at a center thereof with a supporting groove 366 so as to receive and support the lower portion of shaft 306. The lubricant, which is supplied to supporting groove 366, decreases a friction between shaft 306 and cover 364.

Head drum assembly 300 of a video cassette recorder according to the preferred embodiment of the present invention operates as follows.

When shaft 306 is rotated by motor 310, the lubricant contained in first and second bearings 330 and 340 flows between the inner walls of first and second bearings 330 and 340 and an outer wall of shaft 306. The lubricant which has flowed between the inner walls of first and second bearings 330 and 340 and the outer wall of shaft 306 forms oil films there, thereby supporting the radial load of shaft 306. The lubricant evaporating from first bearing 330 concentrates at herringbone grooves 362 of shield plate 360 and forms an oil film between first bearing 330 and shield plate 360 so as to prevent the evaporation of the lubricant in first bearing 330.

When shaft 306 stops its rotation, the lubricant remaining between the inner walls of first and second bearings 330 and 340 and the outer wall of shaft 306 returns to first and second bearings 330 and 340, and the lubricant remaining between first bearing 330 and shield plate 360 returns to first bearing 330. In addition, if the lubricant contained in first and second bearings 330 and 340 is consumed, the lubricant contained in lubricating pads 332 and 342 leaks into first and second bearings 330 and 340. A user can continuously supply the lubricant into inner portions of lubricating pads 332 and 342. Accordingly, first and second bearings 330 and 340 may continuously support shaft 306 even when a long amount of time has lapsed.

Embodiment 1

Figure 5:
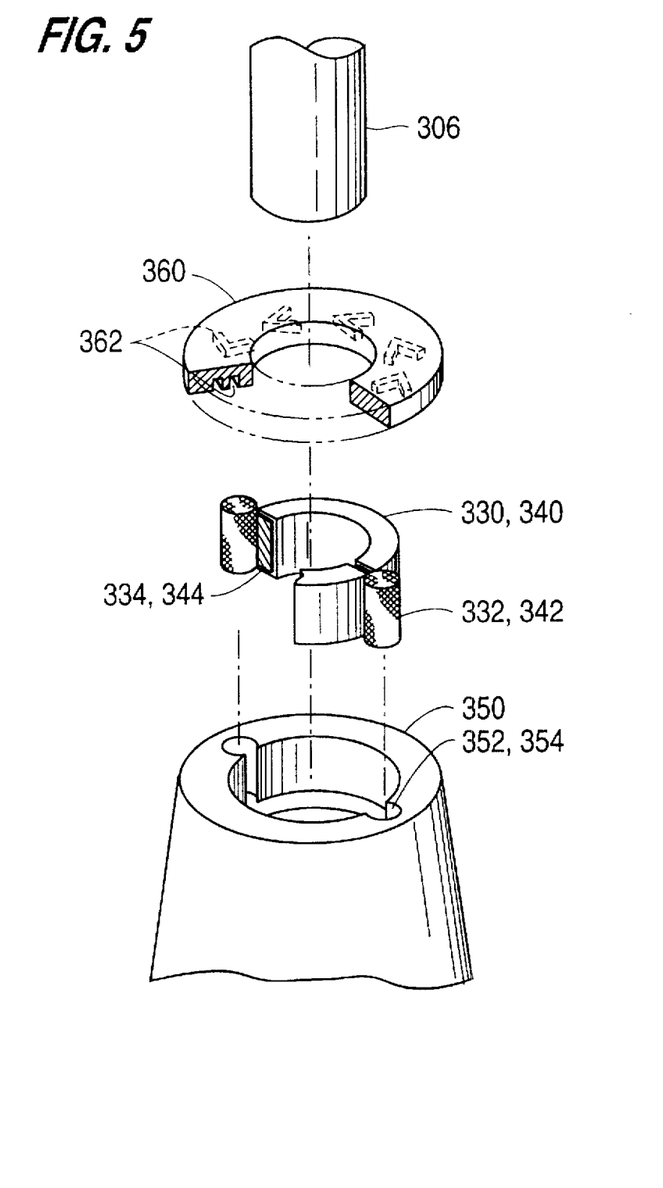
FIGS. 5 and 6 are perspective views for showing examples of the bearings in FIG. 4.

FIG. 5 is a exploded perspective view of an example of first and second bearings 330 and 340 of lubricating device 300 according to the preferred embodiment of the present invention. As shown in FIG. 5, first bearing 330 has a pair of a first lubricant passageways 334 which connect the inner wall, the upper surface, the lower surface and the outer wall of first bearing 330, and through which flows the lubricant contained in the pair of first lubricating pads 332, and second bearing 340 has a pair of a second lubricant passageways 344 which connect the inner wall, the upper surface, the lower surface and the outer wall of second bearing 340, and through which flows the lubricant contained in the pair of second lubricating pads 342. Accordingly, the lubricant contained in the pair of first lubricating pads 332 flows into the inner portion of first bearing 330 by way of pair of first lubricant passageway 334, and the lubricant contained in the pair of second lubricating pads 342 flows into the inner portion of first bearing 340 by way of pair of second lubricant passageways 344.

First and second bearings 330 and 340 are manufactured by sintering particles of an alloy such as a copper alloy, or are manufactured by a soft metal such as a white metal. If first and second bearings 330 and 340 are manufactured by sintering the copper alloy, first and second bearings 330 and 340 are dipped into a lubricant for a while so as to absorb the lubricant therein. Accordingly, first and second bearings 330 and 340 containing the lubricant are fixedly inserted into bearing housing 350. In this case, the lubricant contained in first and second bearings 330 and 340 flows between first and second bearings 330 and 340 and shaft 306 when shaft 306 rotates, thereby supporting the radial load of shaft 306. If first and second bearings 330 and 340 are manufactured by a soft metal, the lubricant contained in the pairs of first and second lubricating pads 332 and 342 flow into the inner portions of first and second bearings 330 and 340 through pairs of lubricant passageways 334 and 344, thereby supporting the radial load of shaft 306.

Embodiment 2

Figure 6:
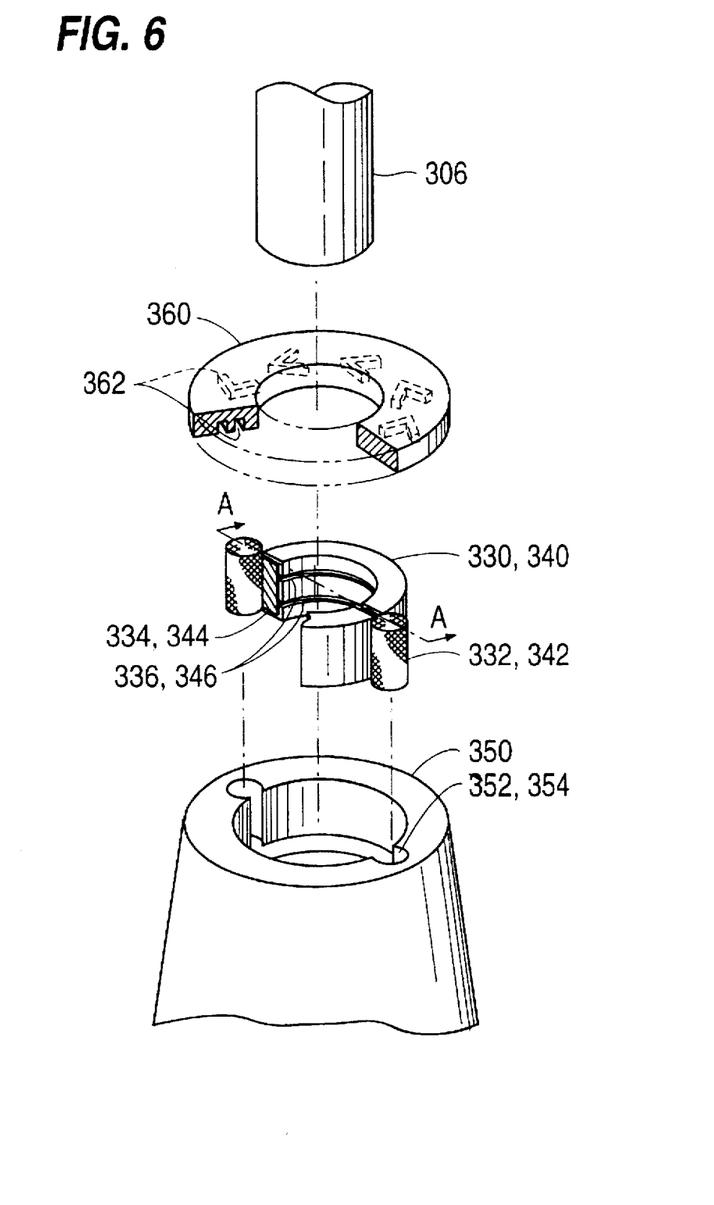

FIG. 6 is a exploded perspective view of another example of first and second bearings 330 and 340 of lubricating device 300 according to the preferred embodiment of the present invention. As show in FIG. 6, first bearing 330 has a pair of a first slots 336 which are connected to the pair of first lubricant passageways 334, and second bearing 340 has a pair of a second slots 346 which are connected to the pair of second lubricant passageways 344. Preferably, the pairs of first and second slots 336 and 346 are formed at inner upper and lower portions of first and second bearings 330 and 340. The lubricant which is supplied to the inner portion of first and second bearings 330 and 340 by way of pairs of first and second lubricant passageways 334 and 344 flow along slots 336 and 346, thereby forming oil films between inner walls of first and second bearings 330 and 340 and an outer wall of shaft 306.

Figure 7:
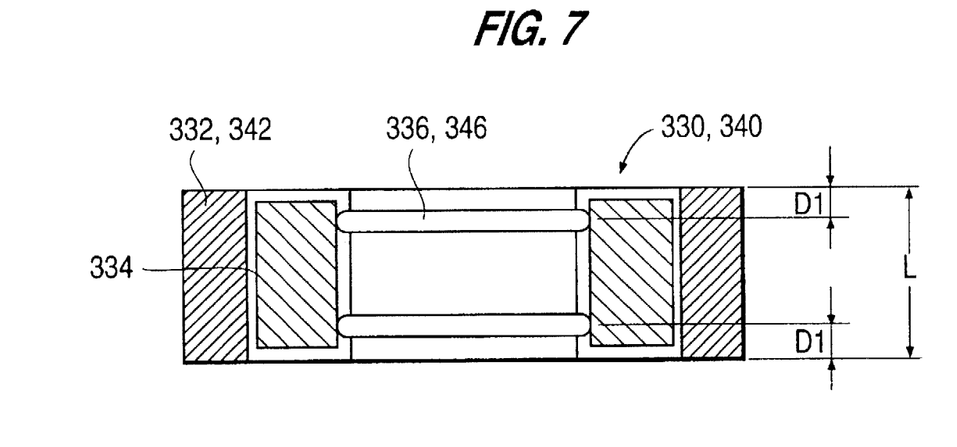
FIG. 7 is a sectional view for showing a bearing of FIG. 5, taken along line A—A of FIG. 5.

As shown in FIG. 7, first and second slots 336 and 346 are respectively spaced at a predetermined length D1 apart from a lower end/upper end of first bearing 330/second bearing 340 340. The lubricating area of first bearing 330/second bearing 340 is maximized when the length D1 is within the below inequality.

$$L/100 \leq D1 \leq L/10 \quad (1)$$

In the above inequality, D1 is a length from the center of slot 336 to the upper end/lower end of first bearing 330/second bearing 340, and L is a length of first bearing 330/second bearing 340.

First and second bearings 330 and 340 are manufactured by a soft metal such as a white metal, or by a high molecular compound resin such as TEFLON. When shaft 306 rotates, the lubricant contained in lubricating pads 332 and 343 are supplied into the inner portions of first and second bearing 330 and 340 through pairs of first and second lubricant passageways 334 and 344 and through slots 336 and 346, thereby supporting the radial load of shaft 306.

As described in the preferred embodiment, since the head drum assembly of the VCR according to the present invention can effectively support the radial and thrust loads of the shaft, can prevent the evaporation of the lubricant in the bearings, and can be additionally supplied the lubricant, it can prevent deterioration of a lubricating effect of the assembly. Since the structure of the apparatus is simple and the apparatus is easy to manufacture, the manufacturing cost of the assembly can be reduced.

Further, the head drum assembly of the VCR according to the present invention can prevent vibration and noise during the rotation of the upper drum of the VCR. Since it supports and lubricates the shaft rotating the upper drum, information can be clearly recorded and reproduced onto and from a magnetic tape, so the graphic quality of the VCR is improved.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A head drum assembly of a video cassette recorder comprising:

a lower drum;

a motor for generating a rotational force, said motor being installed in said lower drum;

an upper drum including magnetic heads for recording video information onto a magnetic tape and for reproducing the video information from the magnetic tape during the rotation of the upper drum, said upper drum being disposed above said lower drum;

a transformer for electrically connecting the magnetic heads to an external apparatus while said upper drum is being rotated, said transformer being installed between a lower surface of said upper drum and an upper surface of said lower drum;

a shaft installed in said motor so as to transfer the rotational force of said motor to said upper drum;

a bearing housing formed at an upper inner portion thereof with a pair of first lubricant containing grooves and formed at a lower inner portion thereof with a pair of second lubricant containing grooves, each pair of the first and second lubricant containing grooves being disposed in a longitudinal direction of said bearing housing in opposition to each other, each of the first and second lubricant containing grooves having a cylindrical shape, said bearing housing being disposed at an inner portion of the lower drum;

first and second bearings for rotatably supporting said shaft, said first and second bearings being fixed and being located in upper and lower inner portions of said bearing housing respectively;

first and second lubricating pads for supplying a lubricant between said first and second bearings and said shaft, said first and second lubricating pads being inserted into the first and second lubricant containing grooves, said first and second lubricating pads being in contact with said first and second bearings; and a shielding means for preventing evaporation of the lubricant which is supplied to said first bearing, said shielding means being disposed between said first bearing and said upper drum, said shaft being inserted into said shielding means, and said shielding means being fixed on a lower surface of said upper drum.

2. A head drum assembly of a video cassette recorder as claimed in claim 1, further comprising a cover for rotatably supporting said shaft, said cover being mounted on said lower drum, being formed at a center thereof with a supporting groove, and supporting a thrust load of said shaft.

3. A head drum assembly of a video cassette recorder as claimed in claim 1, wherein said first and second bearings are comprised of a sintering metal.

4. A head drum assembly of a video cassette recorder as claimed in claim 1, wherein said first and second bearings are comprised of a high-molecular compound resin.

5. A head drum assembly of a video cassette recorder as claimed in claim 1, wherein said first bearing is further formed with a pair of first passageways for connecting the first lubricant containing grooves to an inner wall of said first bearing, and said second bearing is further formed with a pair of second passageways for connecting the second lubricant containing grooves to an inner wall of said second bearing.

6. A head drum assembly of a video cassette recorder as claimed in claim 5, wherein said first bearing has a pair of first slots connected to the first lubricating passageways, the first slots being formed at the inner wall of said first bearing, said second bearing has a pair of second slots connected to the second lubricating passageways, the second slots being formed at the inner wall of said second bearing, and a length from the first and second slots to an end of said first and second bearings being within a following inequality:

$L/100 \leq D1 \leq L/10$ in which D1 is the length from a center of the first slot/second slots to the end of said first bearing/second bearing, and L is a length of said first bearing/second bearing.

7. A head drum assembly of a video cassette recorder as claimed in claim 1, wherein said shielding means comprises an annular plate which is formed at a lower surface with a plurality of herringbone grooves.

8. A head drum assembly of a video cassette recorder as claimed in claim 1, wherein said shielding means is comprised of a rubber.

9. A head drum assembly of a video cassette recorder as claimed in claim 1, wherein said shielding means is comprised of a synthetic resin.

* * * * *